United States Patent [19]
Courtot

[11] 3,995,710
[45] Dec. 7, 1976

[54] TILT-RESPONSIVE VALVE

[75] Inventor: Louis B. Courtot, Euclid, Ohio

[73] Assignee: The Weatherhead Company, Cleveland, Ohio

[22] Filed: Apr. 4, 1975

[21] Appl. No.: 565,005

[52] U.S. Cl. .................................. 180/104; 137/45
[51] Int. Cl.$^2$ ........................................ F16K 17/36
[58] Field of Search .................. 137/38, 39, 43, 45; 180/104

[56] References Cited
UNITED STATES PATENTS

| | | | |
|---|---|---|---|
| 704,529 | 7/1902 | Foskett | 137/38 |
| 941,033 | 11/1909 | Pardee | 137/45 X |
| 2,113,454 | 4/1938 | Mitchell | 137/43 |
| 2,255,965 | 9/1941 | Brandon | 137/45 X |

FOREIGN PATENTS OR APPLICATIONS 808,592  2/1959  United Kingdom ................. 137/45

Primary Examiner—Robert G. Nilson
Attorney, Agent, or Firm—McNenny, Pearne, Gordon, Gail, Dickinson & Schiller

[57] ABSTRACT

A tilt-responsive valve particularly suited for use in a fuel supply system in a motor vehicle for preventing leakage of fuel in the event of upset of the vehicle. The valve includes a closure member biased to a closed position and a pendulum control member for preventing sealing of the closure member when the valve is in a normal range of inclination from the vertical and permitting the closure member to check flow through the valve when the valve is tilted beyond a critical angle.

8 Claims, 8 Drawing Figures

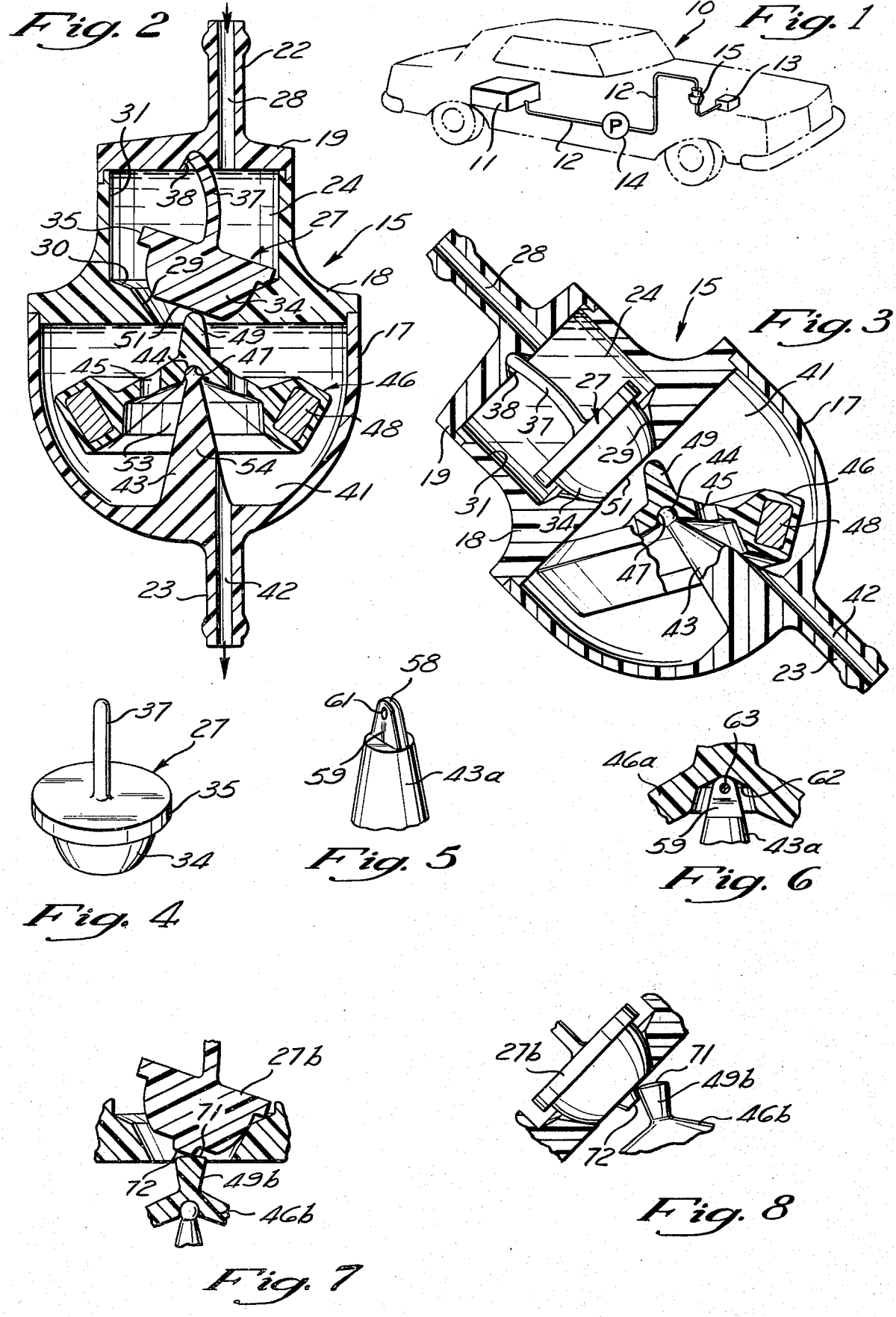

TILT-RESPONSIVE VALVE

BACKGROUND OF THE INVENTION

The invention relates to flow control valves, and particularly to the type of valve responsive to displacement thereof from an upright orientation to shut off flow.

A valve of the type under consideration may be employed as a safety device to prevent flow of a hazardous fluid in the event of an abnormal physical disturbance of a system in which such a valve is employed. More specifically, such valve, hereinafter termed "tilt-responsive valve," may be used to eliminate leakage of gasoline or other flammable fluid fuels in a motor vehicle in the event of an upset or rollover of the vehicle resulting from a collision or other circumstances.

A tilt-responsive valve may be provided in a fuel supply circuit between the supply tank and engine. For example, in a conventional passenger car, aspirated through a carburetor, the tilt valve may be arranged between a fuel pump and the carburetor to prevent leakage from the carburetor. Generally, a tilt-responsive valve includes means operative in response to overturning of the vehicle, and therefore the valve itself, to shut off a flow passage through the valve. Examples of valves in which operative means include a pendulum structure are disclosed in U.S. Pat. Nos. 2,082,723 to Seward, Jr.; 2,194,348 to Zoder; 2,258,323 to Gray; and 2,343,663 to Gregory. An additional disclosure of a tilt-responsive valve is shown in U.S. Pat. No. 535,556 to Robinson.

SUMMARY OF THE INVENTION

The invention provides a tilt-responsive valve in which a valve closure member is spring-biased to a closed position and a pendulum operator prevents closure of the valving member when the valve body is in a vertical or near-vertical orientation. When the valve is rotationally displaced beyond a normal tilt angle, the closure member is released by the pendulum operator to reach its closed position. The spring-biasing force on the closure member advantageously damps movement of the valve elements during normal operation, eliminates random movement of otherwise loose elements, and prevents severe impact loading of the sealing surfaces during sudden extremes of full displacement of the pendulum operator.

The elements of the valve, in accordance with the invention, are arranged in such a manner that the sealing force on the closure member, upon closure, is augmented in direct relation to the pressure of the fluid being checked. This feature permits the valve elements to be relatively light in construction and the normal operating forces to be correspondingly low, thereby allowing the valve to be economically produced and characterized by a relatively long service life.

In a preferred embodiment, the tilt valve closure member and pendulum operator are arranged along a common vertical axis, with the closure member and pendulum on opposite sides of a valve seat. A spring integrally formed with the closure member biases the latter towards a closed position on the seat while an extension of the pendulum above its pivot point normally engages the closure member and prevents it from sealing the valve seat. When the body of the valve is tilted beyond a critical angle, as when the vehicle to which it is attached overturns, the pendulum extension swings out of an interference path with the closure member, allowing it to close.

BRIEF DESCRIPTION OF THE DRAWINGS

FIG. 1 is a somewhat schematic perspective view of a motor vehicle, including a fuel supply system, on which a tilt-responsive valve is provided in accordance with the present invention;

FIG. 2 is a cross sectional view of an enlarged scale of the tilt-responsive valve of the invention;

FIG. 3 is a view similar to FIG. 2, illustrating the valve in a tilted and closed position;

FIG. 4 is a perspective view of a valve closure member and integral spring-biasing element;

FIG. 5 is a fragmentary view of a modified pendulum pivot point, integral with the valve body, used where it is desired to limit pivotal movement of the pendulum to a single plane;

FIG. 6 is a fragmentary view of the modified pivot point of FIG. 4 in its relationship with an associated area of the pendulum; and FIGS. 7 and 8 are fragmentary views of a modified valve closure and pendulum extension for maintaining substantially full flow through the valve until the actual point of valve closure upon reaching a critical tilt angle.

DESCRIPTION OF THE PREFERRED EMBODIMENT

Referring to FIG. 1, there is shown a conventional passenger car or other motor vehicle 10 having a fuel supply system including a supply tank 11 and a fuel line 12 extending from the tank to a carburetor 13 or other device for distributing fuel to the combustion area of the vehicle's engine (not shown). The supply system may include a fuel pump 14 driven directly by the engine or an auxiliary electric motor according to conventional practice. In the fuel supply system, preferably between the fuel pump 14 and carburetor 13, a tilt-responsive valve 15 is provided.

A body of the tilt valve 15 includes a lower housing section 17, an intermediate valving section 18, and an upper end cap section 19. The various sections 17, 18, and 19 are molded or otherwise formed of suitable material compatible with each other and suitable for containing hydrocarbon fuel such as gasoline. The sections 17, 18, and 19 may be of plastic, for example, and are welded, adhesively secured, or otherwise joined in fluidtight relation. The upper end cap 19 includes an inlet nipple 22 adapted to be received in a hose forming a portion of the supply line 12. The lower housing section 17 provides a similar nipple 23 adapted to be similarly connected to a hose portion of the line leading to the carburetor 13. The end cap 19 forms a wall closure for a generally cylindrical operating chamber 24 for a valve closure member 27. A passage 28 of the nipple 22 conducts fluid into the operating chamber 24.

At a lower end of the chamber 24, there is provided a conical valve seat surface 29 defining a central, vertical axis through the valve 15. It will be understood that various other annular valve seat surfaces may be employed, such as a spherical surface or an edge surface formed by intersecting surface planes. A peripheral ledge 30 extends radially outwardly from the seat 29 to a cylindrical wall surface 31 defining the cylindrical chamber 24.

The valving member 27 (FIG. 4) is molded or otherwise formed of elastomeric material suitable for use with hydrocarbon fuel. The closure member 27 includes a lower spherical portion 34 dimensioned to seal against the conical seat 29 in the manner of a check valve. Immediately adjacent the spherical closure portion 34 is an integral radial flange or shoulder 35 adapted to rest on the adjacent body ledge 30 when the valving member 27 assumes a cocked orientation within the valve body, as shown in FIG. 2.

Integral with the closure member 27 is a columnar spring element 37 which extends upwardly into a receiving pocket 38 in the end wall 19. The pocket 38 centers the distal end of the spring element 37 on the axis of the valve. The spring element 37 is dimensioned with sufficient length to be deflected when assembled into a buckling mode to resiliently bias the closure member 27 axially towards the seat 29 and maintain a slight biasing force on the closure member when it is seated on this surface, as illustrated in FIG. 3. Where desired, various other structural arrangements for the spring element 37 may be employed, including helical configurations and/or elements which are nonintegral with the valving member 27.

The valve seat 29 communicates with a hemispherical cavity 41 in the lower housing 17. A passage 42 in the outlet nipple 23 exhausts fluid from this cavity 41. An integral post 43 extends axially upwardly from a lower side of the housing section 17 and includes at its distal end a spherical or ball segment 44 for pivotally supporting a hollow, conical pendulum 46. The underside of the apex of the cone 46 includes an integral spherical socket 47 in which the ball segment 44 is pivotally received. The pendulum 46 is molded or cast of suitable material for service with hydrocarbon fuels. The pendulum 46 has embedded within a lower end of its conical skirt a ring 48 of high density material, such as lead, which comprises a majority of the mass of the pendulum. This skirt may be apertured as at 45.

Above the pivot socket 47 and along the axis of the pendulum 46, defined by its conical skirt portion, is an integral camming finger 49 which is adapted to engage a lower camming surface 51 of the valving member 27. The pendulum camming finger 49 is arranged to control the valving member 27 by holding it open or out of sealing contact with the seat 29 when the body of the valve 15 is in the upright position of FIG. 2 and within an angle of tilt within a normal operational range from the vertical. As shown in FIG. 3, when the body of the valve 15 has been rotated through an angle greater than a critical angle, the camming finger is displaced radially and axially, by rocking movement, from the path of the valving or closure member 27 by the influence of gravity on the pendulum 46. A clearance angle 53 within the pendulum 46, reduced by an angle 54 defined by the post 43, is at least twice as wide as the critical tilt angle to permit full pivotal displacement of the pendulum and release of the valving member 27.

The body of the valve 15 is suitably fixed relative to the body of the vehicle 10 such that the valve assumes the attitude of the vehicle. In the event of an upset of the vehicle 10, as by collision of other mishap, the pendulum 46 of the valve will assume the valve closing position of FIG. 3 relative to the valve body, including situations where the valve body is tilted in excess of the critical angle, for example, where the valve body is rotated 90 degrees as where the vehicle comes to rest on its side or end, and 180 degrees where the vehicle comes to rest on its top. The universal mounting provided by the ball and socket elements 44 and 47 allows the valve 15 to be responsive to upsets of the vehicle about a longitudinal axis, i.e., side-over-side and/or about a lateral axis, i.e., end-over-end. Since the valving closure member 27 is arranged on the upstream side of the valve seat 29 with respect to the normal direction of fluid flow through the valve 15, the closing force on it, upon seating, is augmented in direct relation to the pressure of the fluid being checked.

FIGS. 5 and 6 illustrate a modification of the pivot area of the post, designated 43a, and the pendulum designated 46a. The post 43a includes a cylindrical support surface 58 on a triangular, planar tab 59 formed at its top. Concentric with the cylindrical surface 58 is a bore 61 transverse through the body of the tab 59. The pendulum 46a has a blind slot 62 formed in the underside of its apex and dimensioned to fit over the triangular tab 59, as indicated in FIG. 6. A retaining pin 63 is inserted through the pivot tab hole 61 and suitable holes in the pendulum to lock these members together while allowing pivotal movement in the plane of the tab 59. The structure of FIGS. 5 and 6 is employed where it is desired to limit the sensitivity and operation of the pendulum 46a and valve 15 to only one plane.

FIGS. 7 and 8 illustrate a modified arrangement of the pendulum and valving members designated 46b and 27b, respectively. As shown, a pendulum camming finger 49b includes a spherical camming surface 71 at its upper or distal end. This surface 71 is arranged to engage a mating surface 72 on the underside of the valving member 27b. The arcuate length of the spherical surface 71 is arranged to maintain the valve closure member 27b in a normally and fully open position until a critical angle, shown in FIG. 8, is reached and the surface slips out from under the surface 72.

The disclosed valve structure when empoyed in series in the fuel supply line of a motor vehicle is adapted to prevent flow through the line upon upset of such vehicle. In both of the embodiments of FIGS. 2, 3, and 7,8, the mass of the pendulum 46,46b is arranged to reopen the valving member 27,27b when the vehicle is uprighted. The disclosed valve 15 is adapted for use with various types of hydrocarbon fuels other than conventional gasoline, both liquid and gaseous, and in systems other than a motor vehicle. In such instances, the materials chosen for the various valve elements are selected in accordance with their intended use. The spring-biasing force on the valving members 27,27b provided by the biasing spring element 37 maintains contact between the valving member and pendulum during normal operation, and thereby tends to advantageously damp motion of the elements and avoid vibration-induced impacts between elements of the valve.

While the invention has been described in connection with specific embodiments thereof, it is to be clearly understood that this is done only by way of example, and not as a limitation to the scope of the invention as set forth in the objects thereof and in the appended claims.

What is claimed is:

1. A tilt-responsive valve comprising a valve body, a check valve within the body, said valve including an annular valve seat and a valve seat closure member, means biasing said closure member towards a closed position, said biasing means including means to develop an axial force on said closure member towards said annular seat, a valve control pendulum in said body, control means associated with said pendulum for maintaining said closure member in an open position when said valve body is substantially upright or within a normal range of inclination from a substantially upright position and for permitting said biasing means to close said closure member when said valve body is tilted from an upright position beyond said range of normal inclination, said control means comprising an integral extension of said pendulum above a pivot center of said pendulum, said pendulum and said valving member being disposed on opposite sides of said annular valve seat, said closure member and said biasing means being integrally formed of elastomeric material.

2. A valve as set forth in claim 1, including pivot support means for said pendulum, and pivot support means including means for vertically supporting said pendulum when said body is inverted.

3. A valve as set forth in claim 2, wherein said pendulum support means comprises a ball and socket connection.

4. A valve as set forth in claim 2, wherein said pendulum support means includes means for limiting pivotal movement of said pendulum to a single plane.

5. A valve as set forth in claim 2, wherein said pivot support means is coaxial with said annular seat.

6. A tilt-responsive valve comprising a valve body, a check valve within the body, said check valve including an annular valve seat and a valve seat closure member, said valve body including a housing cavity, a valve control pendulum in said housing cavity, means responsive to the position of said pendulum for maintaining said closure member in an open position when said body is in a substantially upright position or is within a normal range of inclination from a substantially upright position and for closing said closure member when said body is beyond a normal range of inclination, said pendulum including a hollow skirt portion, means within said housing cavity extending axially into said skirt portion and pivotally supporting said pendulum at a point on the underside of its apex.

7. A valve as set forth in claim 6, wherein said support means includes means to support said pendulum when said body is inverted.

8. In an automotive vehicle, a fuel supply line for conducting fuel from a tank to an engine, a tilt-responsive check valve on the vehicle connected to and controlling fuel flow through said line, said valve including a body, an annular valve seat along a vertical axis within the body, a closure member in said body disposed vertically above the valve seat, a pendulum in said body disposed vertically below said valve seat, spring means for biasing said closure member into sealing contact with said valve seat, said pendulum having a conical hollow skirt portion providing a majority of its mass, a support for said pendulum extending axially upwardly into said skirt portion and supporting said pendulum from a point at the underside of its apex, said pendulum including an integral camming finger adapted to engage an underside surface of said valving member when the body is in a vertical position or within a normal range of inclination, said pendulum camming finger being arranged to move out of the path of said valving member when said body is tilted with said vehicle beyond a normal range of inclination and permit said closure member to seal said seat under the influence of said spring means to thereby prevent flow of fuel through said line when said vehicle is upset.

\* \* \* \* \*

UNITED STATES PATENT AND TRADEMARK OFFICE
CERTIFICATE OF CORRECTION

PATENT NO. : 3,995,710
DATED : December 7, 1976
INVENTOR(S) : Louis B. Courtot

It is certified that error appears in the above-identified patent and that said Letters Patent are hereby corrected as shown below:

Column 3, line 60, "of" should be --or--.

Column 5, line 14, "and pivot support" should be --said pivot support--.

Signed and Sealed this

Fifteenth Day of February 1977

[SEAL]

Attest:

RUTH C. MASON
Attesting Officer

C. MARSHALL DANN
Commissioner of Patents and Trademarks